United States Patent [19]

Hikida

[11] Patent Number: 4,847,899
[45] Date of Patent: Jul. 11, 1989

[54] POWER CIRCUIT FOR TELEPHONE ACCESSORY DEVICES

[75] Inventor: Nobuharu Hikida, Nara, Japan

[73] Assignee: Sharp Kabushiki Kaisha, Osaka, Japan

[21] Appl. No.: 225,591

[22] Filed: Jul. 27, 1988

Related U.S. Application Data

[63] Continuation of Ser. No. 31,518, Mar. 27, 1987, abandoned.

[30] Foreign Application Priority Data

Nov. 20, 1986 [JP] Japan .................. 61-179621[U]

[51] Int. Cl.[4] .................................... H04M 19/00
[52] U.S. Cl. ................................ 379/413; 379/387
[58] Field of Search ............... 379/387, 412, 413, 394, 379/324

[56] References Cited

U.S. PATENT DOCUMENTS

| 4,591,666 | 5/1986 | Boeckmann | 379/412 X |
| 4,636,588 | 1/1987 | Nakayama et al. | 379/362 |
| 4,647,787 | 3/1987 | Pommer, II | 379/413 |
| 4,675,902 | 6/1987 | Boeckmann | 379/394 |

FOREIGN PATENT DOCUMENTS

| 0074761 | 4/1985 | Japan | 379/413 |
| 0150364 | 8/1985 | Japan | 379/413 |

Primary Examiner—Jin F. Ng
Assistant Examiner—Randall S. Vaas
Attorney, Agent, or Firm—Flehr, Hohbach, Test, Albritton & Herbert

[57] ABSTRACT

A power circuit for supplying power to a device, which is connected in parallel with a telephone to a telephone line to that power is normally supplied to it from the central telephone office, includes batteries and a switching circuit such that the power source for the device is switched to these batteries when a voltage drop in the normal power source is detected.

3 Claims, 2 Drawing Sheets

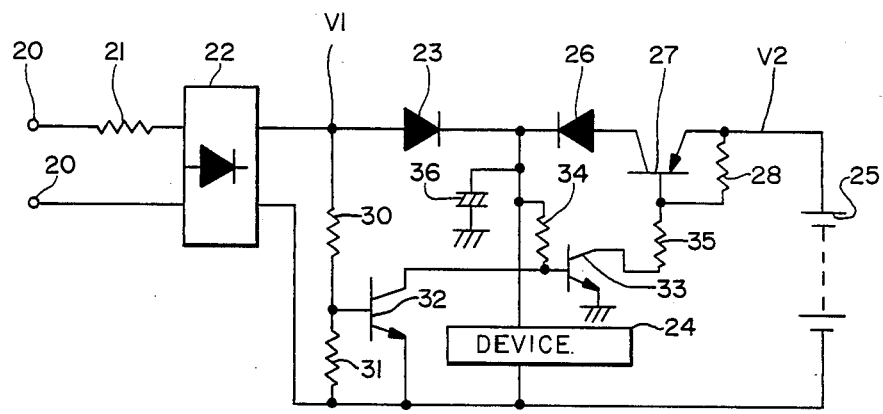
FIG.—1
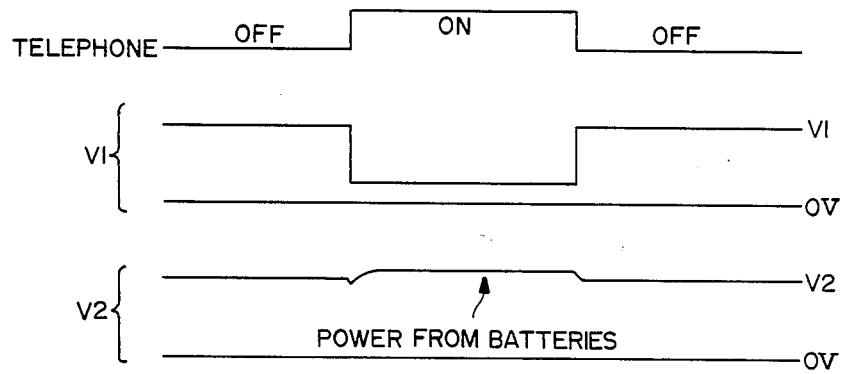
FIG.—2

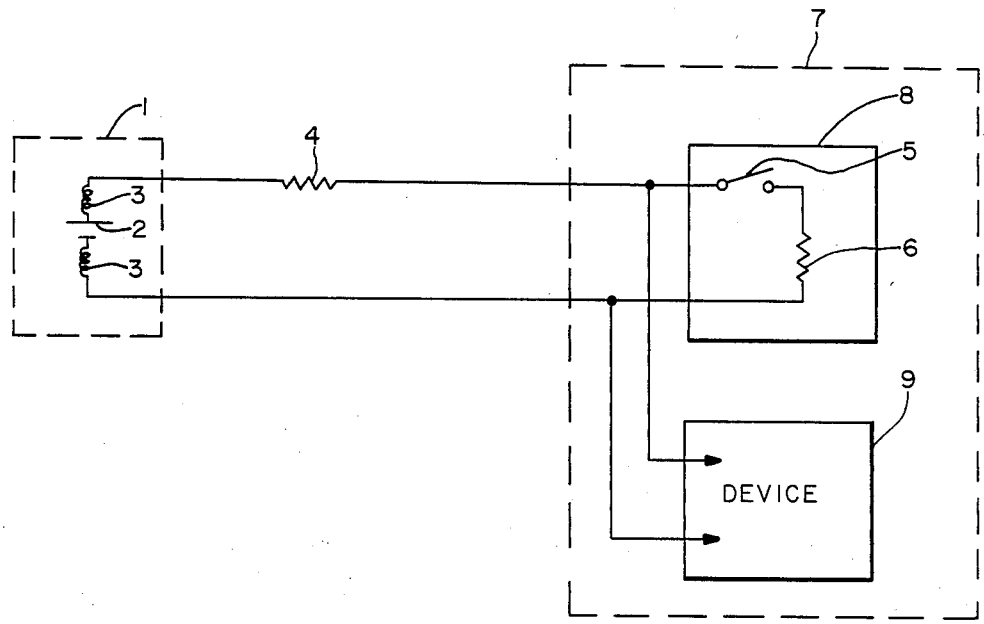
(PRIOR ART)
FIG.—3
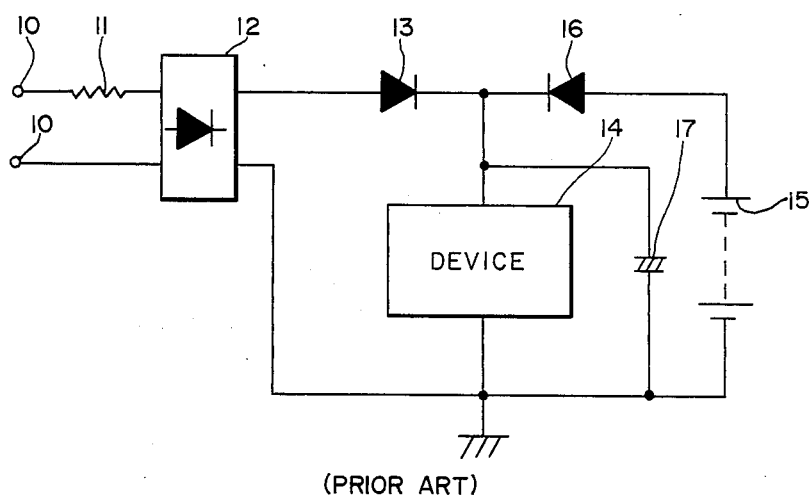
(PRIOR ART)
FIG.—4

POWER CIRCUIT FOR TELEPHONE ACCESSORY DEVICES

This is a continuation of application Ser. No. 031,518 filed Mar. 27, 1987, now abandoned.

BACKGROUND OF THE INVENTION

This invention relates to a power circuit having batteries for a multi-functional telephone or an accessory device connected to a telephone line and normally backed by a power source at the central telephone office.

FIG. 3 shows a conventional circuit for supplying power to a multi-functional home telephone or a telephone accessory device through a telephone line. A power source 2 at the central telephone office 1 with a steady voltage of about 48±5 V is connected through coils 3 at both ends thereof and a telephone line 4 with resistance of zero to over 1000Ω to a telephone 8 and an accessory device 9 at a subscriber's home 7. The telephone 8 includes a switch 5 and has a DC resistance 6 of about 50 to 300Ω. The accessory device 9 is connected to the line 4 in parallel relationship with the telephone 8.

With a circuit structured as described above, a high voltage is applied to the accessory device 9 when the telephone 8 is in the OFF condition such as when it is disconnected or in a hold condition. As soon as the telephone 8 becomes connected, or switched on, however, the voltage on the accessory device 9 drops to less than $48\ V \times (50/1000)$. In other words, the accessory device 9 of FIG. 3 loses its backup voltage from the telephone office 1 as soon as a call is taken by the telephone 8.

FIG. 4 shows a previously considered power circuit with batteries 15 with which a desired voltage can be applied to such an accessory device when the telephone connected in parallel therewith is switched on and the voltage from the power source 2 at the office 1 drops substantially. With reference to FIG. 4, terminals 10 for connection with a telephone line are connected to a diode bridge 12 through a resistor 11 of 1MΩ. Numeral 14 indicates a circuit representing a telephone accessory device which requires a backup voltage and is connected to this diode bridge 12 through a first diode 13. Batteries 15 are connected to a junction between this first diode 13 and the circuit 14 through a second diode 16 which is in the opposite direction to the first diode 13. A capacitor 17 is connected in parallel with the series circuit comprised of the batteries 15 and the second diode 16. With a circuit thus constructed, the high voltage of the power source 2 from the telephone office 1 is applied to the circuit 14 of the accessor device 9 through the telephone line, the terminals 10, the diode bridge 12 and the first diode 13 when the telephone 8 is disconnected, or in the OFF condition. When the telephone 8 is switched on, or becomes connected and the voltage of the power source 2 drops, however, the batteries 15 begin to supply power to the circuit 14 of the accessory device 9 through the second diode 16, serving as a backup power source.

The disadvantage of the circuit shown in FIG. 4 is that the batteries 15 play the role of a backup power source whenever the source voltage from the central office becomes lower than the battery voltage even by a small amount. Thus, the batteries are quickly used up and they must be replaced frequently with new ones. This is both cumbersome and uneconomical.

SUMMARY OF THE INVENTION

It is therefore an object of the present invention to eliminate the aforementioned disadvantage by providing an economically advantageous power circuit with which the useful lifetime of batteries can be extended and hence they need not be replaced frequently.

The above and other objects of this invention are achieved by providing a power circuit with batteries and a switching circuit which, upon detecting a voltage drop in the normal power source, causes these batteries to serve as the power source.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a circuit diagram of a power circuit embodying the present invention,

FIG. 2 is a time chart of voltages to explain the operation of the circuit shown in FIG. 1, FIG. 3 is a schematic circuit diagram showing the connection of a home telephone and its accessory device to a telephone line, and FIG. 4 is a circuit diagram of a previously considered power circuit with batteries for a home telephone and its accessory device.

DETAILED DESCRIPTION OF THE INVENTION

As shown in FIG. 1 which is a circuit diagram of a power circuit according to one embodiment of the present invention, terminals 20 for connection with a telephone line are connected to a diode bridge 22 through a resistor 21 of 1MΩ and a circuit 24 representing a telephone accessory device requiring a backup is connected to this diode bridge 22 through a first diode 23 as explained above in connection with FIG. 4. Batteries 25 as a power source for the circuit 24 are connected to a junction point between the first diode 23 and the circuit 24 through a series connection of a second diode 26 disposed in the direction opposite to the first diode 23 and the collector-emitter of a first transistor 27. The base and the emitter of this first transistor 27 are connected by a first resistor 28.

A second resistor 30 and a third resistor 31 are connected in series to the output terminals of the diode bridge 22 and the base of a second transistor 32 is connected to a junction point between the second resistor 30 and the third resistor 31. The emitter of this second transistor 32 is connected to a junction point between the third resistor 31 and the output terminal of the diode bridge 22. The collector of the second transistor 32 is connected to the base of a third transistor 33. The junction point between the first diode 23 and the second diode 26 is further connected to the base of this third transistor 33 through a fourth resistor 34. The emitter of the third transistor 33 is grounded and its collector is connected to the base of the first transistor 27 through a fifth resistor 35. The aforementioned junction point between the first diode 23 and second diode 26 is also grounded through a capacitor 36.

When the telephone is in the OFF condition such as when it is disconnected or in a hold condition, the source voltage $V_1$ from the central telephone office is applied to the circuit 24 through the telephone line, the terminals 20, the diode bridge 22 and the first diode 23. When a call is received and the telephone is switched on, the voltage $V_1$ from the central office drops as shown in the time chart of FIG. 2. This causes the divided voltages across the second resistor 30 and the third resistor 31 also to drop and, as a result, the second transistor 32 is switched off. When the second transistor 32 is switched off, the third transistor 33 is switched on and the first transistor 27 is also switched on, thereby applying the voltage $V_2$ of the batteries 25 to the circuit 24 through the first transistor 27 and the second diode 26.

In summary, power is supplied from the batteries 25 only when the voltage from the central office drops. Since the total length of time during which a call is received by telephone is generally very short compared to the typical useful lifetime of a battery, this invention serves to extend the lifetimes of the batteries in the power circuit. The present invention is particularly effective if the voltage $V_2$ by the batteries 25 is higher than the voltage V1 of the power source at the central office. Accordingly, the present invention is particularly useful to a system which requires a certain level of voltage to be maintained when a call is received by the associated telephone.

The foregoing description of a preferred embodiment of the invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention.

What is claimed is:

1. In a power circuit for supplying power to a device connected through a telephone line to a central power source which normally supplies power to said device, the improvement wherein said power circuit comprises batteries and switching means for detecting a voltage drop in said central power source and thereupon automatically causing said batteries to serve as a power source for said device, said switching means comprising a diode bridge having input terminals connected to said telephone line and output terminals connected to said device, a first diode connected between said device and said diode bridge, a first transistor, the collector and the emitter thereof being connected respectively to said device and to said batteries, a second transistor having the base and emitter therof so connected to said diode bridge through a voltage divider as to be switched off by a voltage drop in said central power source, a third transistor, the base thereof being connected to the collector of said second transistor and the emitter thereof being grounded, a second diode connected between said device and the collector of said first transistor, said first and second diodes being connected head-to-head relationship with respect to each other, a first resistor connecting the emitter and the base of said first transistor, said voltage divider being formed as a series connection of a second resistor and a third resistor at a junction, the base of said second transistor being connected to said junction.

a fourth resistor connected between the base of said third transistor and said device, and d first a fifth resistor connected between the base of said transistor and the collector of said third transistor.

2. The power circuit of claim 1 wherein said device is connected in parallel with a telephone to said telephone line such that when said telephone is connected, said second transistor is switched off, said third transistor is thereby switched on, said first transistor is thereby switched on and the voltage of said batteries is applied to said device through said first transistor and said second diode.

3. The power circuit of claim 1 further comprising a capacitor through which a point between said first and second diodes is grounded.

* * * * *